United States Patent
Olarig

[11] Patent Number: 5,922,080
[45] Date of Patent: Jul. 13, 1999

[54] METHOD AND APPARATUS FOR PERFORMING ERROR DETECTION AND CORRECTION WITH MEMORY DEVICES

[75] Inventor: Sompong P. Olarig, Harris, Tex.

[73] Assignee: Compaq Computer Corporation, Inc., Houston, Tex.

[21] Appl. No.: 08/940,054

[22] Filed: Sep. 30, 1997

Related U.S. Application Data

[63] Continuation-in-part of application No. 08/654,853, May 29, 1996., Pat. No. 5,740,188

[51] Int. Cl.[6] .................................................. G11C 29/00
[52] U.S. Cl. ............................................ 714/767; 714/773
[58] Field of Search ..................... 371/40.11, 40.12, 371/40.18, 40.17

[56] References Cited

U.S. PATENT DOCUMENTS

| | | | |
|---|---|---|---|
| 5,291,498 | 3/1994 | Jackson et al. | 371/40.1 |
| 5,313,475 | 5/1994 | Cromer et al. | 371/40.1 |
| 5,369,651 | 11/1994 | Marisetty | 371/40.1 |
| 5,430,742 | 7/1995 | Jeddeloh et al. | 371/40.1 |
| 5,555,250 | 9/1996 | Walker et al. | 371/40.1 |
| 5,740,188 | 4/1998 | Olarig | 371/40.11 |

*Primary Examiner*—Stephen M. Baker
*Attorney, Agent, or Firm*—Akin, Gump, Strauss, Hauer & Feld, LLP

[57] ABSTRACT

A memory system for performing error detection and correction including a memory device that stores a plurality of data words, where each data word has a plurality of data bits and at least one associated check bit. The memory system further includes memory control circuitry that reads a plurality of data words in multiple cycles to form a block word that includes a sufficient number of check bits to perform detection of double bit errors and correction of single bit errors. A 72-bit block word is formed by grouping smaller data words retrieved from the memory device. For a 9-bit device with eight data bits and one check bit, eight burst cycles may be used to retrieve a 72-bit data block. Similarly, for 18-bit devices, four burst cycles may be used to retrieve the data block and for 36-bit devices, two burst cycles may be used to retrieve the data block. The memory system further includes error logic that receives and performs error detection and correction upon the block word. The error logic groups the check bits of the block word together, generates a syndrome code using a parity matrix, and uses the syndrome code and a corresponding syndrome table to detect and correct any bit errors in the data.

20 Claims, 12 Drawing Sheets

FIG. 5

|  |  |  | 1111 | 1111 | 2222 | 2222 | 2233 | 3333 | 3333 | 4444 | 4444 | 4455 | 5555 | 5555 | 6666 | cccc | cccc |
|---|---|---|---|---|---|---|---|---|---|---|---|---|---|---|---|---|---|
| 0123 | 4567 | 8901 | 2345 | 6789 | 0123 | 4567 | 8901 | 2345 | 6789 | 0123 | 4567 | 8901 | 2345 | 6789 | 0123 | 0123 | 4567 |
| ←──────────────────────────────── Data Bits ────────────────────────────────→ | | | | | | | | | | | | | | | | ← Check Bits → | |
| 1110 | 1010 | 0011 | 1110 | 0000 | 1010 | 1010 | 1011 | 0010 | 1000 | 0110 | 1110 | 1000 | 1000 | 0001 | 1000 | 1000 | 0000 |
| 1010 | 0101 | 1010 | 0011 | 1000 | 1000 | 1000 | 1000 | 1010 | 0011 | 0010 | 1011 | 0111 | 0000 | 0110 | 0000 | 0100 | 0000 |
| 0001 | 1001 | 1001 | 0000 | 1110 | 0100 | 0010 | 0010 | 0111 | 0001 | 1010 | 1010 | 1010 | 0110 | 0010 | 1101 | 0010 | 0000 |
| 0000 | 0010 | 0010 | 1010 | 0000 | 0110 | 0110 | 0100 | 1001 | 1110 | 0011 | 0100 | 0100 | 1011 | 0110 | 0000 | 0001 | 0000 |
| 0001 | 0000 | 0000 | 0001 | 0101 | 0011 | 1001 | 0001 | 0100 | 0101 | 1110 | 0000 | 0000 | 0101 | 0001 | 0011 | 0000 | 1000 |
| 0100 | 1111 | 0100 | 0101 | 0001 | 1011 | 0100 | 1000 | 0000 | 1110 | 0101 | 0101 | 1101 | 0000 | 1000 | 0111 | 0000 | 0100 |
| 1001 | 0110 | 1010 | 0001 | 1001 | 1010 | 0001 | 1001 | 0101 | 0010 | 0010 | 0000 | 0010 | 0010 | 1000 | 0101 | 0000 | 0010 |
| 0110 | 0000 | 0101 | 1001 | 0101 | 0111 | 0110 | 0101 | 0101 | 1010 | 0110 | 0000 | 0000 | 0000 | 1101 | 0001 | 0000 | 0001 |

FIG. 6

| | | | | | | | |
|---|---|---|---|---|---|---|---|
| 00 No Error | 20 CB05 | 40 CB06 | 60 UNCER | 80 CB07 | A0 UNCER | C0 UNCER | E0 DB56 |
| 01 CB00 | 21 UNCER | 41 UNCER | 61 DB13 | 81 UNCER | A1 DB01 | C1 DB45 | E1 UNCER |
| 02 CB01 | 22 UNCER | 42 UNCER | 62 DB20 | 82 UNCER | A2 DB09 | C2 DB47 | E2 UNCER |
| 03 UNCER | 23 DB28 | 43 DB00 | 63 UNCER | 83 DB02 | A3 UNCER | C3 UNCER | E3 UNCER |
| 04 CB02 | 24 UNCER | 44 UNCER | 64 DB06 | 84 UNCER | A4 DB40 | C4 DB61 | E4 UNCER |
| 05 UNCER | 25 DB60 | 45 DB08 | 65 UNCER | 85 DB30 | A5 UNCER | C5 UNCER | E5 UNCER |
| 06 UNCER | 26 DB39 | 46 DB16 | 66 UNCER | 86 DB11 | A6 UNCER | C6 UNCER | E6 UNCER |
| 07 DB18 | 27 UNCER | 47 UNCER | 67 UNCER | 87 UNCER | A7 UNCER | C7 UNCER | E7 UNCER |
| 08 CB03 | 28 UNCER | 48 UNCER | 68 DB05 | 88 UNCER | A8 DB25 | C8 DB29 | E8 UNCER |
| 09 UNCER | 29 DB52 | 49 DB10 | 69 UNCER | 89 DB12 | A9 UNCER | C9 UNCER | E9 UNCER |
| 0A UNCER | 2A DB04 | 4A UNCER | 6A UNCER | 8A DB57 | AA UNCER | CA UNCER | EA UNCER |
| 0B DB14 | 2B UNCER | 4B UNCER | 6B UNCER | 8B UNCER | AB UNCER | CB UNCER | EB UNCER |
| 0C UNCER | 2C DB33 | 4C DB54 | 6C UNCER | 8C DB21 | AC UNCER | CC UNCER | EC UNCER |
| 0D DB26 | 2D UNCER | 4D UNCER | 6D UNCER | 8D UNCER | AD UNCER | CD UNCER | ED UNCER |
| 0E DB58 | 2E UNCER | 4E UNCER | 6E UNCER | 8E UNCER | AE UNCER | CE UNCER | EE UNCER |
| 0F UNCER | 2F DB42 | 4F DB46 | 6F UNCER | 8F DB34 | AF UNCER | CF UNCER | EF UNCER |
| 10 CB04 | 30 UNCER | 50 UNCER | 70 DB62 | 90 UNCER | B0 DB23 | D0 DB27 | F0 UNCER |
| 11 UNCER | 31 DB41 | 51 DB31 | 71 UNCER | 91 DB59 | B1 UNCER | D1 UNCER | F1 DB19 |
| 12 UNCER | 32 DB07 | 52 DB51 | 72 UNCER | 92 DB32 | B2 UNCER | D2 UNCER | F2 DB15 |
| 13 DB24 | 33 UNCER | 53 UNCER | 73 UNCER | 93 UNCER | B3 UNCER | D3 UNCER | F3 UNCER |
| 14 UNCER | 34 DB53 | 54 DB03 | 74 UNCER | 94 DB17 | B4 UNCER | D4 UNCER | F4 DB63 |
| 15 DB48 | 35 UNCER | 55 UNCER | 75 UNCER | 95 UNCER | B5 UNCER | D5 UNCER | F5 UNCER |
| 16 DB50 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 DB55 | 38 DB37 | 58 DB37 | 78 UNCER | 98 DB43 | B8 UNCER | D8 UNCER | F8 DB22 |
| 19 DB36 | 39 UNCER | 59 UNCER | 79 UNCER | 99 UNCER | B9 UNCER | D9 UNCER | F9 UNCER |
| 1A DB38 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB UNCER |
| 1C DB35 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB44 | 3F UNCER | 5F UNCER | 7F UNCER | 9F UNCER | BF UNCER | DF UNCER | FF UNCER |

FIG. 9

| | | | | | | | |
|---|---|---|---|---|---|---|---|
| 00 No Error | 20 CB5 | 40 CB6 | 60 UNCER | 80 CB7 | A0 UNCER | C0 UNCER | E0 DB61 |
| 01 CB0 | 21 UNCER | 41 pin17(4bits) | 61 DB62 | 81 UNCER | A1 DB44 | C1 DB50 | E1 UNCER |
| 02 CB1 | 22 UNCER | 42 pin6(4bits) | 62 DB49 | 82 UNCER | A2 DB52 | C2 DB37 | E2 UNCER |
| 03 UNCER | 23 DB1 | 43 DB32 | 63 UNCER | 83 DB34 | A3 UNCER | C3 UNCER | E3 UNCER |
| 04 CB2 | 24 UNCER | 44 UNCER | 64 DB57 | 84 UNCER | A4 DB45 | C4 DB51 | E4 UNCER |
| 05 UNCER | 25 DB8 | 45 DB20 | 65 UNCER | 85 DB56 | A5 UNCER | C5 pin5(4bits) | E5 UNCER |
| 06 UNCER | 26 DB9 | 46 DB10 | 66 UNCER | 86 DB43 | A6 pin13(4bits) | C6 UNCER | E6 UNCER |
| 07 DB30 | 27 UNCER | 47 UNCER | 67 UNCER | 87 UNCER | A7 UNCER | C7 UNCER | E7 UNCER |
| 08 CB3 | 28 UNCER | 48 UNCER | 68 DB15 | 88 DB36 | A8 DB26 | C8 DB39 | E8 UNCER |
| 09 UNCER | 29 DB38 | 49 DB25 | 69 UNCER | 89 UNCER | A9 UNCER | C9 UNCER | E9 UNCER |
| 0A UNCER | 2A DB21 | 4A DB11 | 6A UNCER | 8A DB24 | AA pin1(4bits) | CA UNCER | EA UNCER |
| 0B DB0 | 2B UNCER | 4B pin12(4bits) | 6B UNCER | 8B UNCER | AB UNCER | CB UNCER | EB UNCER |
| 0C UNCER | 2C DB4 | 4C DB46 | 6C UNCER | 8C DB60 | AC UNCER | CC UNCER | EC UNCER |
| 0D DB1 | 2D UNCER | 4D UNCER | 6D UNCER | 8D UNCER | AD UNCER | CD UNCER | ED UNCER |
| 0E DB2 | 2E UNCER | 4E pin3(4bits) | 6E UNCER | 8E pin15(4bits) | AE UNCER | CE UNCER | EE UNCER |
| 0F UNCER | 2F DB19 | 4F DB12 | 6F UNCER | 8F DB31 | AF UNCER | CF UNCER | EF UNCER |
| 10 CB4 | 30 UNCER | 50 UNCER | 70 DB48 | 90 UNCER | B0 DB53 | D0 DB55 | F0 UNCER |
| 11 UNCER | 31 DB23 | 51 DB42 | 71 UNCER | 91 DB41 | B1 UNCER | D1 pin8(4bits) | F1 DB54 |
| 12 UNCER | 32 DB47 | 52 DB13 | 72 UNCER | 92 DB59 | B2 UNCER | D2 UNCER | F2 DB40 |
| 13 DB14 | 33 UNCER | 53 UNCER | 73 UNCER | 93 UNCER | B3 UNCER | D3 UNCER | F3 UNCER |
| 14 pin4(4bits) | 34 DB35 | 54 DB28 | 74 UNCER | 94 DB63 | B4 UNCER | D4 UNCER | F4 DB58 |
| 15 DB5 | 35 pin9(4bits) | 55 pin0(4bits) | 75 UNCER | 95 UNCER | B5 UNCER | D5 UNCER | F5 UNCER |
| 16 DB6 | 36 pin14(4bits) | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 DB17 | 38 DB33 | 58 DB18 | 78 UNCER | 98 DB29 | B8 UNCER | D8 pin10(4bits) | F8 DB27 |
| 19 DB3 | 39 pin16(4bits) | 59 UNCER | 79 UNCER | 99 UNCER | B9 UNCER | D9 UNCER | F9 UNCER |
| 1A UNCER | 3A UNCER | 5A UNCER | 7A UNCER | 9A pin11(4bits) | BA UNCER | DA UNCER | FA UNCER |
| 1B pin2(4bits) | 3B UNCER | 5B UNCER | 7B UNCER | 9B UNCER | BB UNCER | DB UNCER | FB UNCER |
| 1C DB7 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB22 | 3F UNCER | 5F UNCER | 7F UNCER | 9F UNCER | BF UNCER | DF UNCER | FF UNCER |

FIG. 12

| 00 No Error | 20 CB5 | 40 CB6 | 60 DB28&60 | 80 CB7 | A0 UNCER | C0 UNCER | E0 DB34 |
|---|---|---|---|---|---|---|---|
| 01 CB0 | 21 UNCER | 41 UNCER | 61 DB37 | 81 DB7&39 | A1 DB38 | C1 DB42 | E1 DB25&57 |
| 02 CB1 | 22 CB1&5 | 42 DB14&46 | 62 DB25 | 82 UNCER | A2 DB39 | C2 DB26 | E2 DB11&43 |
| 03 UNCER | 23 DB7 | 43 DB17 | 63 UNCER | 83 DB57 | A3 UNCER | C3 UNCER | E3 UNCER |
| 04 CB2 | 24 UNCER | 44 DB2&6 | 64 DB56 | 84 UNCER | A4 DB54 | C4 DB53 | E4 UNCER |
| 05 DB30&62 | 25 DB8 | 45 DB18 | 65 UNCER | 85 DB49 | A5 UNCER | C5 DB23&55 | E5 UNCER |
| 06 DB3&35 | 26 DB9 | 46 DB19 | 66 DB12&24 | 86 DB27 | A6 UNCER | C6 DB17&49 | E6 UNCER |
| 07 DB29 | 27 UNCER | 47 UNCER | 67 UNCER | 87 UNCER | A7 UNCER | C7 UNCER | E7 UNCER |
| 08 CB3 | 28 UNCER | 48 UNCER | 68 DB58 | 88 CB3&7 | A8 DB40 | C8 DB43 | E8 DB10&42 |
| 09 UNCER | 29 DB10 | 49 DB20 | 69 UNCER | 89 DB45 | A9 UNCER | C9 DB18&50 | E9 UNCER |
| 0A UNCER | 2A DB11 | 4A DB44 | 6A DB9&41 | 8A DB51 | AA DB26&58 | CA UNCER | EA UNCER |
| 0B DB0 | 2B UNCER | 4B UNCER | 6B UNCER | 8B UNCER | AB UNCER | CB UNCER | EB UNCER |
| 0C UNCER | 2C DB12 | 4C DB41 | 6C UNCER | 8C DB50 | AC DB16&48 | CC DB19&51 | EC UNCER |
| 0D DB1 | 2D UNCER | 4D UNCER | 6D UNCER | 8D DB8&40 | AD UNCER | CD UNCER | ED UNCER |
| 0E DB2 | 2E UNCER | 4E UNCER | 6E UNCER | 8E UNCER | AE UNCER | CE UNCER | EE DB2&34 |
| 0F DB4&36 | 2F DB28 | 4F DB60 | 6F UNCER | 8F DB31 | AF UNCER | CF UNCER | EF UNCER |
| 10 CB4 | 30 UNCER | 50 UNCER | 70 DB46 | 90 UNCER | B0 DB32 | D0 DB33 | F0 UNCER |
| 11 CB0&4 | 31 DB13 | 51 DB21 | 71 UNCER | 91 DB55 | B1 UNCER | D1 DB20&52 | F1 DB30 |
| 12 UNCER | 32 DB14 | 52 DB22 | 72 UNCER | 92 DB47 | B2 UNCER | D2 UNCER | F2 DB63 |
| 13 DB3 | 33 UNCER | 53 UNCER | 73 UNCER | 93 UNCER | B3 UNCER | D3 UNCER | F3 UNCER |
| 14 UNCER | 34 DB15 | 54 DB23 | 74 UNCER | 94 DB48 | B4 UNCER | D4 UNCER | F4 DB62 |
| 15 DB35 | 35 UNCER | 55 UNCER | 75 UNCER | 95 DB21&53 | B5 UNCER | D5 UNCER | F5 UNCER |
| 16 DB4 | 36 UNCER | 56 UNCER | 76 UNCER | 96 UNCER | B6 DB15&47 | D6 UNCER | F6 DB22&54 |
| 17 UNCER | 37 UNCER | 57 UNCER | 77 UNCER | 97 UNCER | B7 UNCER | D7 UNCER | F7 UNCER |
| 18 DB29&61 | 38 DB16 | 58 DB24 | 78 UNCER | 98 DB52 | B8 DB13&45 | D8 UNCER | F8 DB59 |
| 19 DB36 | 39 UNCER | 59 UNCER | 79 UNCER | 99 UNCER | B9 UNCER | D9 UNCER | F9 UNCER |
| 1A DB5 | 3A UNCER | 5A UNCER | 7A UNCER | 9A UNCER | BA UNCER | DA UNCER | FA UNCER |
| 1B UNCER | 3B UNCER | 5B UNCER | 7B DB5&37 | 9B UNCER | BB DB0&32 | DB UNCER | FB UNCER |
| 1C DB6 | 3C DB24&56 | 5C UNCER | 7C UNCER | 9C UNCER | BC UNCER | DC UNCER | FC UNCER |
| 1D UNCER | 3D UNCER | 5D UNCER | 7D DB31&63 | 9D UNCER | BD DB6&38 | DD DB1&33 | FD UNCER |
| 1E UNCER | 3E UNCER | 5E UNCER | 7E DB27&59 | 9E UNCER | BE UNCER | DE UNCER | FE UNCER |
| 1F DB61 | 3F UNCER | 5F UNCER | 7F UNCER | 9F UNCER | BF UNCER | DF UNCER | FF UNCER |

METHOD AND APPARATUS FOR PERFORMING ERROR DETECTION AND CORRECTION WITH MEMORY DEVICES

CROSS-REFERENCE TO RELATED APPLICATIONS

This application is a continuation-in-part of application Ser. No. 08/654,853, now U.S. Pat. No. 5,740,188, entitled "Error Checking and Correcting for Burst DRAM Devices" filed May 29, 1996, in which the inventor was the same, Sompong P. Olarig, and which was assigned to the same assignee as the present application.

FIELD OF THE INVENTION

The present invention relates to a method and apparatus for supporting error detection and error correction modes in a memory system, and more particularly to a method and apparatus for supporting error detection and error correction modes in a memory system that utilizes memory devices which include at least one error bit, also called a "check bit", for each byte of data.

DESCRIPTION OF THE RELATED ART

Today, the performance of microprocessors is increasing rapidly due to rapidly advancing electronics technologies, so that processors require higher memory bandwidth. The bandwidth of the commonly used dynamic random access memory (DRAM) device is becoming insufficient to satisfy the needs of system designers. Cache memory is commonly used to fill the bandwidth gap, but its additional cost is prohibitive in cost sensitive systems, such as consumer personal computers (PCs). New types of DRAM devices are being proposed to help alleviate the memory bottleneck problem. These proposed devices are intended to deliver high memory bandwidth by running at very high clock speeds.

The extremely high clock frequency of these devices, together with the high speeds of today's microprocessors, create a system environment that is increasingly noisy. Thus, data in these high speed systems becomes more vulnerable to errors caused by transient electrical and electromagnetic phenomena. Although a well-designed memory subsystem is extremely reliable, even the best memory subsystem, especially one incorporating fast DRAM devices, has the possibility of a memory device failure.

Operating memory devices at higher frequencies generally increases the likelihood and frequency of memory failures or faults. Memory device failures fall generally into two categories. The first category is a soft error, which refers to those errors where data stored at a given memory location change, but where subsequent accesses can store the correct data to the same location with no more likelihood of returning incorrect data than from any other location. Soft errors of this type are generally caused by loss of charge in the DRAM cell. The second category of error is a hard error, which refers to those errors in which data can no longer reliably be stored at a given memory location. Either of these types of errors can lead to catastrophic failure of the memory subsystem.

In an effort to minimize failures due to memory subsystem errors, various error checking schemes have been developed to detect, and in some cases correct, errors in data read from memory. The most simple of the error checking schemes is parity. In a byte-wide parity system, one extra parity bit is appended to every eight bits of data. For "even parity" systems, the parity bit is set such that the total number of ones in the nine-bit word is even. For "odd parity" systems, the parity bit is set to make the total number of ones odd. When data is read from memory, if one of the nine bits changes from one to zero or vice versa, the parity will be incorrect and the error will be detected. This system is limited, however, because there is no way to know which of the nine bits changed. Therefore, single bit errors can only be detected, not corrected. Also, if two bits change, the parity will again be correct and no error will be detected. Parity therefore is capable of detecting only odd numbers of bit errors.

Other considerations, such as whether to use error checking and correction (ECC), error detection code (EDC), such as parity, or byte mask circuitry, has also influenced the design of systems. For consumer desktops, for example, memory bandwidth is an important consideration for increased system performance. Conversely, designers of high-end systems, such as servers, are more inclined to design systems that include ECC or EDC to ensure data integrity. While detection of errors is very useful, it also is desirable to be able to correct certain errors. ECC techniques have been developed that both detect and correct certain errors. Generally speaking, the goal of ECC is to correct the largest possible number of errors with the smallest possible overhead (in terms of extra error bits and wait states) to the system.

The "Hamming codes" constitute one well-known class of ECCs and are widely used for error control in digital communications and data storage systems. The Hamming Codes are described in Lin et al., "Error Control Coding, Fundamentals and Applications", Chapter 3 (1982). One subclass of the Hamming codes that is particularly well-suited for memory subsystems includes the single-error-correcting and double-error detecting (SEC-DED) codes. In these codes, the check bits are generated prior to data being written to memory using a parity-check matrix implemented in ECC hardware. In the Hamming code for 72-bit words, which include 64 data bits, eight error bits are generated. The error bits, or check bits, are then stored in memory together with the data. When a memory read occurs, the ECC hardware retrieves both the data and the corresponding check bits from memory. The ECC hardware then applies the parity check matrix to the data and the check bits, producing a code of "syndrome bits." If the syndrome bits are all zeros, this indicates there are no errors. If the syndrome bits contain ones, the data are possibly invalid. In the case of a single bit error, the syndrome bits will indicate which bit is in error, and thus allow correction, but complimenting the erroneous bit. In the case of double bit errors, the error will be detected, but correction is not possible. A description of the SEC-DED Hamming codes is found in Lin et al, supra, Chapter 16. Table 1 illustrates the required number of error bits for a given range of data bits.

TABLE 1

| No. of Error Bits Required | Range of No. of Data Bits |
| --- | --- |
| 3 | 2–4 |
| 4 | 5–11 |
| 5 | 12–26 |
| 6 | 27–57 |
| 7 | 58–120 |

In general, for error correction to be accomplished successfully, the relationship between the number of data bits, n, to be checked and the number of error bits, k, associated with those n data bits is as follows: $2^k-1-k \geq n$.

Another well-known ECC is the "Reed-Solomon code", which is widely used for error correction by the compact disk industry. A detailed description of this ECC is found in Hove et al., "Error Correction and Concealment in the Compact Disc System", *Philips Technical Review*, Vol. 40 (1980), No. 6, pages 166–172. The Reed-Solomon code is able to correct two errors per code word. Other conventional ECC techniques include: the b-adjacent error correction code described in Bossen, "b-Adjacent Error Correction", IBM J. Res. Develop., pp. 402–408 (July, 1970), and the odd weight column codes described in Hsiao, "A Class of Optimal Minimal Odd Weight Column SEC-DED Codes", *IBM J. Res. Develop.*, pp. 395–400 (July, 1970). The Hsiao codes, like the Hamming codes, are capable of detecting double bit errors and correcting single bit errors. The Hsiao codes use the same number of check bits as the Hamming codes (e.g., eight check bits for 64 bits of data), but are superior in that hardware implementation is simplified and the speed of error detection is improved.

It is desired to provide a memory system and method that takes advantage of increased speed and performance of memory devices and memory subsystems while also providing error detection and/or correction.

SUMMARY OF THE INVENTION

A memory system according to the present invention for performing error detection and correction includes at least one memory device that stores a plurality of data words, where each data word has a plurality of data bits and at least one associated check bit. The memory system further includes burst circuitry that reads a plurality of data words in multiple cycles into a block word to include a sufficient number of check bits to perform detection of double bit errors and correction of single bit errors, and error logic that receives and performs error detection and correction upon the block word.

In the embodiments illustrated herein, the block word is 72-bits including 64 bits of data and eight (8) check bits. The 72-bit block word is formed by grouping smaller data words retrieved from the memory device. For a 9-bit device with eight data bits and one check bit, eight burst cycles may be used to retrieve a 72-bit data block. Similarly, for 18-bit devices with 16 data bits and two check bits, four burst cycles may be used to retrieve the data block and for 36-bit devices with 32 data bits and four check bits, two burst cycles may be used to retrieve the data block. In general, each data word includes "n" data bits and "k" check bits, and the burst circuitry groups "p" data words to form a block word having (p·n) data bits and (p·k) error bits for a total of (p·n)+(p·k) bits, where $2^{(p \cdot k)}-1-(p \cdot k) \leq (p \cdot n)$. In a first illustrated 9-bit case, n=8, k=1 and p=8. For an 18-bit case, n=16, k=2 and p=4 and for a 36-bit case, n=32, k=4 and p=2.

The error logic preferably generates a syndrome code from a parity matrix and uses the syndrome code to detect single bit errors and to detect double bit errors. The error logic may use a parity-check matrix and a corresponding syndrome table for error detection and/or correction. The memory devices may be one or more burst dynamic random access memory (DRAM) devices or the like, although any type of memory may be used depending upon the memory controller.

A memory system according to the present invention takes advantage of increased speed and performance of newer memory devices and memory subsystems while also providing error detection and/or correction for data integrity.

BRIEF DESCRIPTION OF THE DRAWINGS

A better understanding of the present invention can be obtained when the following detailed description of the preferred embodiment is considered in conjunction with the following drawings, in which:

FIG. 5 is a parity-check matrix in accordance with a 9-bit DRAM embodiment according to the present invention;

FIG. 6 is a syndrome table in accordance with the embodiment of FIG. 5;

FIG. 9 is a syndrome table in accordance with the embodiment of FIG. 8;

FIG. 12 is a syndrome table in accordance with the embodiment of FIG. 11;

FIG. 14 illustrates an embodiment of a 72-bit wide ECC encoded data word in accordance with the embodiment of FIG. 10.

DETAILED DESCRIPTION OF THE PREFERRED EMBODIMENT

New types of DRAM devices, such as Rambus and synchronous DRAMs (SDRAMs), are being proposed to help reduce the memory bottleneck faced by system designers. These "burst DRAM" devices are typically programmable and deliver high memory bandwidth by running at a very high clock frequency, such as 200 megahertz (MHz) or greater. An example of such a programmable burst cycle device is a SLDRAM, which is a DRAM configured according to the SyncLink standard for burst DRAM communication promulgated in the publication "Draft Standard for A High-Speed Memory Interface (SyncLink)", copyright 1996, by the Institute of Electrical and Electronics Engineers, Inc. (IEEE). A SLDRAM typically operates in a packet oriented protocol such that it is programmable for a burst of either 4 or 8 clock cycles of data being transferred in any read or write operation cycle.

Figure 1:
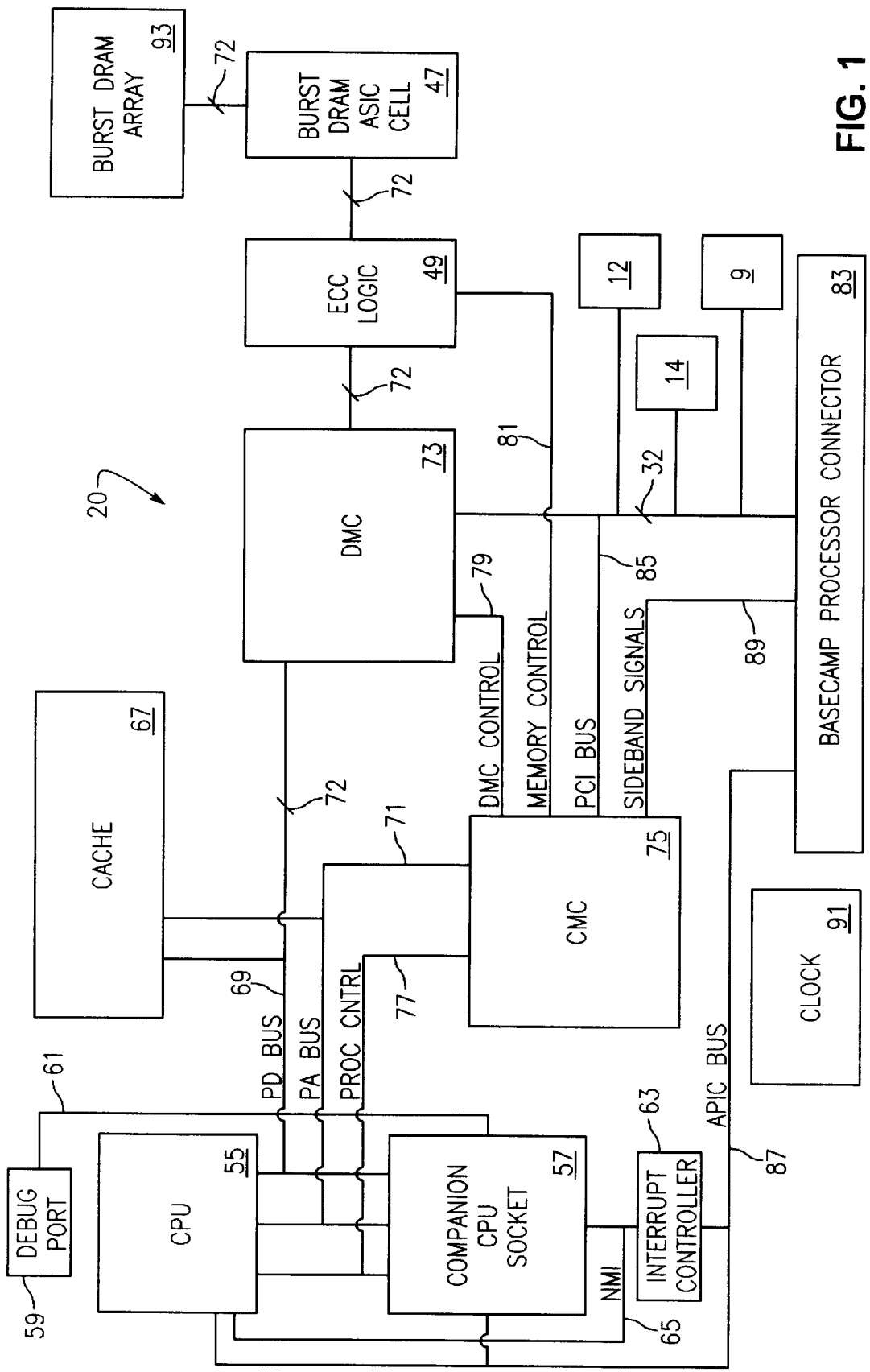
FIG. 1 illustrates a computer system incorporating a memory system which includes a burst DRAM array and ECC logic in accordance with an embodiment of the present invention.

FIG. 1 is a block diagram representation of a computer system 20 employing burst dynamic random access memory (DRAM) devices and error correction code (ECC) logic in accordance with an embodiment of the present invention. Each DRAM includes n data bits and k extra error bits associated with the n data bits. The system comprises a CPU 55, which may be the P54C processor available from Intel, or may be any one of several microprocessors and supporting external circuitry typically used in PCs, such as the 80386, 80486, Pentium™, Pentium II™, etc. microprocessors from Intel Corp. The external circuitry preferably includes an external or level two (L2) cache or the like (not shown). A companion CPU socket 57 is also provided for dual processor implementations, and may be the P54CM socket available from Intel. Both CPU 55 and companion CPU socket 57 communicate with a debug port 59 via a debug signal line 61 and with an interrupt controller 63 via a non-maskable interrupt (NMI) line 65.

On-board cache 67 is provided, preferably a 512K L2 cache, that communicates with CPU 55 via processor data (PD) bus 69 and processor address (PA) bus 71. The PD bus 69 is 72 bits wide, and is also applied to data memory control (DMC) 73. Cache and memory control (CMC) 75 communicates with PA bus 71 and also with processor control bus 77. CMC provides DMC control line 79 to DMC 73 and also memory control line 81 to ECC logic 49. A basecamp processor connector 83 provides peripheral interface for both the peripheral component interface (PCI) bus 85 and APIC bus 87. Additional control signals are provided from the CMC 75 to the connector 83 via sideband signal line 89. A clock 91 provides system timing. An input device 12 such as a keyboard, a display device 14 such as a monitor, and an external memory storage device 9 such as a disk drive, are coupled to PCI bus 85. The keyboard 12, display device 14 and the memory storage device 9 may be coupled in any desired fashion as known to those skilled in the art of computer system design and operation.

ECC logic 49 and Burst DRAM application specific integrated circuit (ASIC) Cell (BDAC) 47 are connected via a 72-bit wide bus. The bus connecting burst DRAM ASIC cell (BDAC) 47 and burst DRAM array 93 is "n" bits wide, where n is any positive integer. Preferably, n is a multiple of nine (9) bits, such as 9, 18, 36, depending on the system configuration. Burst DRAM array 93 includes one or more burst DRAMs (shown in FIG. 2). Although BDAC 47, ECC logic 49, and DMC 73 are shown as separate functional elements in the block diagram of FIG. 1, they need not necessarily be separate physical elements. Each of these elements may be implemented in one or more ASICs depending upon the size of available ASIC packaging. Various other alternatives will be apparent to the skilled artisan. Accordingly, it is clear that the particular configuration of these elements is not crucial to the invention.

Figure 2:
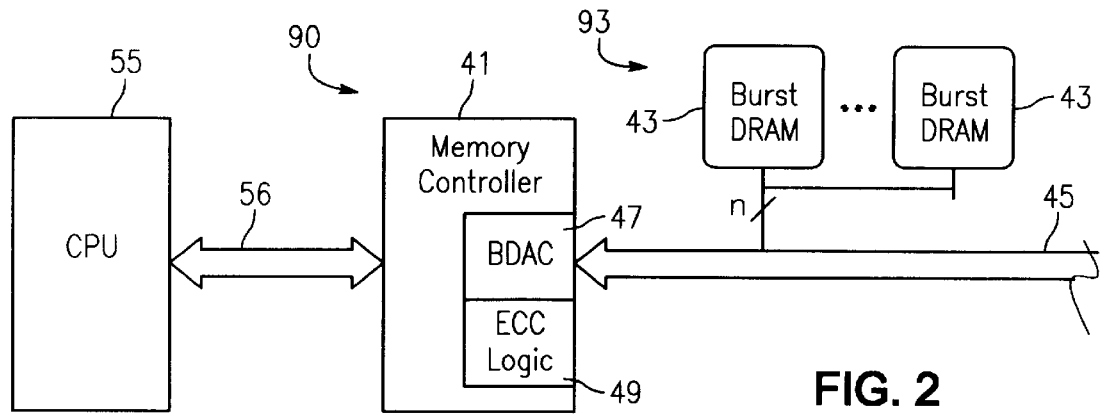
FIG. 2 is a block diagram of an embodiment of the memory system of FIG. 1 which incorporates a memory controller in accordance with an embodiment of the present invention.

FIG. 2 illustrates a memory subsystem 90 for use in the computer system 20, where the memory subsystem 90 includes one or more burst DRAM devices 43 implementing the burst DRAM array 93. The DRAM devices 43 communicate with a memory controller 41 via memory bus 45 of n bits wide, where n equals the bit width of each of the burst DRAM devices 43. In one embodiment, the burst DRAM devices 43 are 9-bit devices, where n=9 corresponding to an 8-bit data byte and one error bit, so that the data path to each burst DRAM device 43 is nine bits wide. A memory controller 41 may be of any type known in the art, and is generic to CMC ASIC 19 and DMC ASIC 23 of FIG. 1. In the embodiment shown, the memory controller 41 incorporates the BDAC 47 and the ECC logic 49. The BDAC 47 groups multiple 9-bit bursts in a data format conversion operation, converting the 9-bit wide high speed data output from each burst DRAM 43 into larger block words, each typically a 72-bit block word which includes 64 data bits and 8 parity bits. These larger 72-bit block words are read by memory controller 41 and CPU 55. A simplified interface 56 is shown representing the various buses and devices between the CPU 55 and the memory controller 41.

The ECC logic block 49 performs ECC manipulation on the 72-bit words, which include grouped 9-bit data bursts from the burst DRAM devices 43. For a 9-bit DRAM 43, there is eight data bits and an error bit. Four error bits would be required. As explained above and indicated in Table 1, ECC techniques require a certain number of error bits for a certain number of associated data bits. Grouping two 9-bit words together would result in 16 bits of data with two error bits, which is still not enough to perform an ECC operation on 16 bits of data (five error bits needed).

It is convenient to group an eight cycle burst which includes eight 9-bit words into a larger 72-bit word to take advantage of the fact that an ECC operation can be performed on 64 data bits using a minimum of seven error bits. Since each of the eight 9-bit words includes an associated error bit, the 72-bit word formed includes eight error bits, which is sufficient to perform an ECC operation. Any multiple of 9-bit words greater than five can be bursted to achieve a sufficient number of available error bits for the corresponding data to perform an ECC operation. For an embodiment using 9-bit DRAMs 43, a 72-bit block word is formed in eight burst cycles. For an embodiment using 18-bit DRAMs 43, a 72-bit block word is formed in four burst cycles. To accomplish an ECC operation, four 18-bit words are bursted from the DRAMs 43 and grouped to form a 72-bit block word. Since each of the four 18-bit words includes two associated error bits, the 72-bit word formed includes 64 data bits and eight error bits, which is sufficient to perform an ECC operation. Thus, if 18-bit DRAMs are used in a memory system, four 18-bit words are packaged together by BDAC 47 of memory controller 41 to form the 72-bit block word processed in the ECC operation.

Likewise, in another embodiment using 36-bit DRAMs 43, each 36-bit word includes 32 data bits and four error bits. Two 36-bit words are bursted and grouped together by BDAC 47 to form a 72-bit block word which is to undergo the ECC operation in the ECC logic 49. The 72-bit block word would again includes eight error bits, which is sufficient for an ECC operation on the resulting 64 data bits included in the 72-bit word. If it is desired to always burst in cycles of at least four, then four 36-bit words are bursted and grouped together by the BDAC 47 to form two 72-bit block words or one 144-bit word, where the ECC logic 49 performs ECC operations on the entire 144-bit word or separately on the two 72-bit words.

Figure 3:
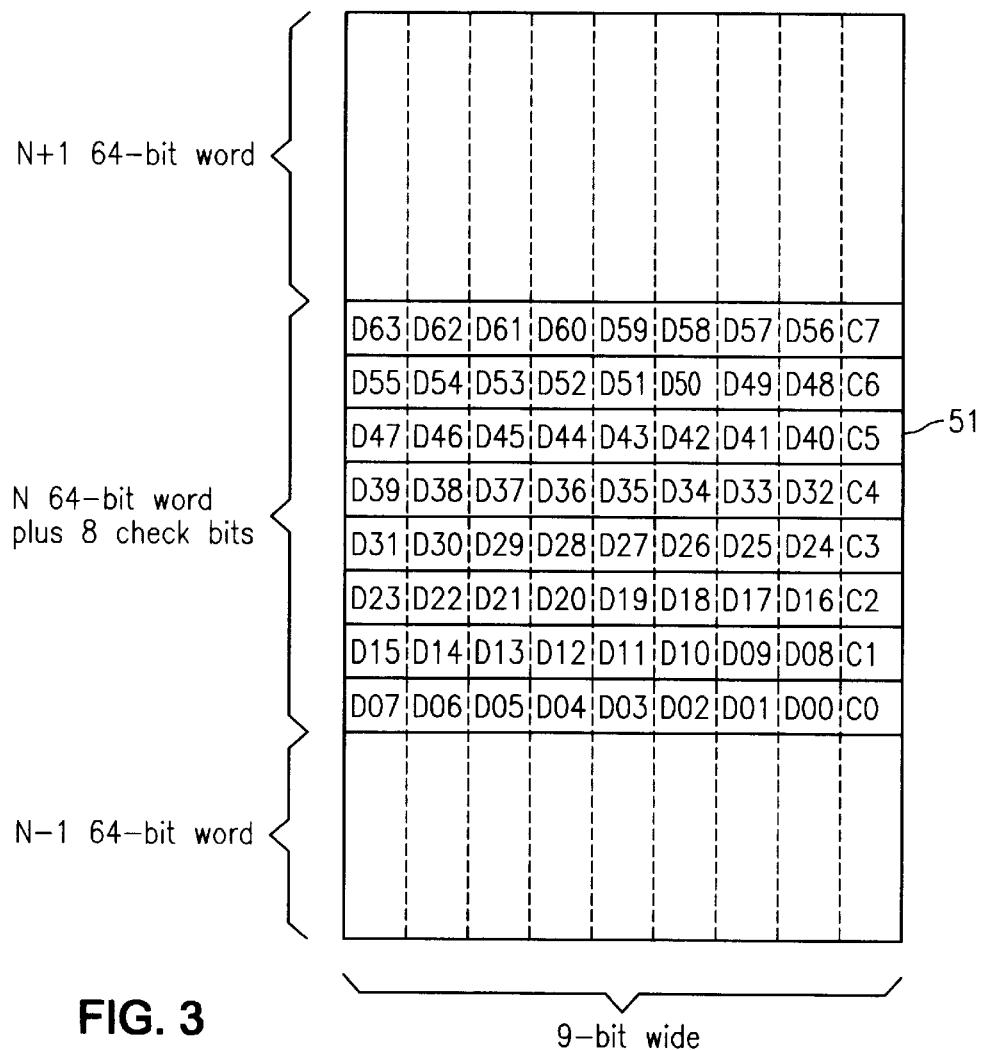
FIG. 3 illustrates an embodiment of a data distribution representing a 72-bit word including eight 9-bit data words.
Figure 4:
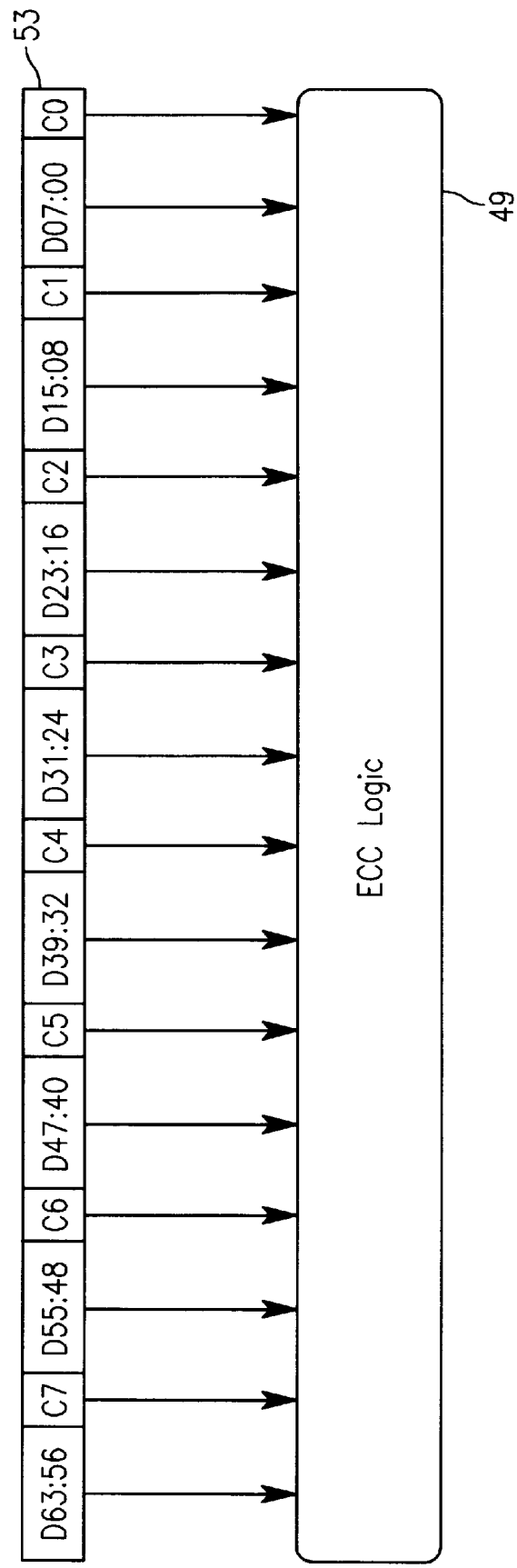
FIG. 4 illustrates an embodiment of a 72-bit wide ECC encoded data word in accordance with the embodiment of FIG. 3.
Figure 7:
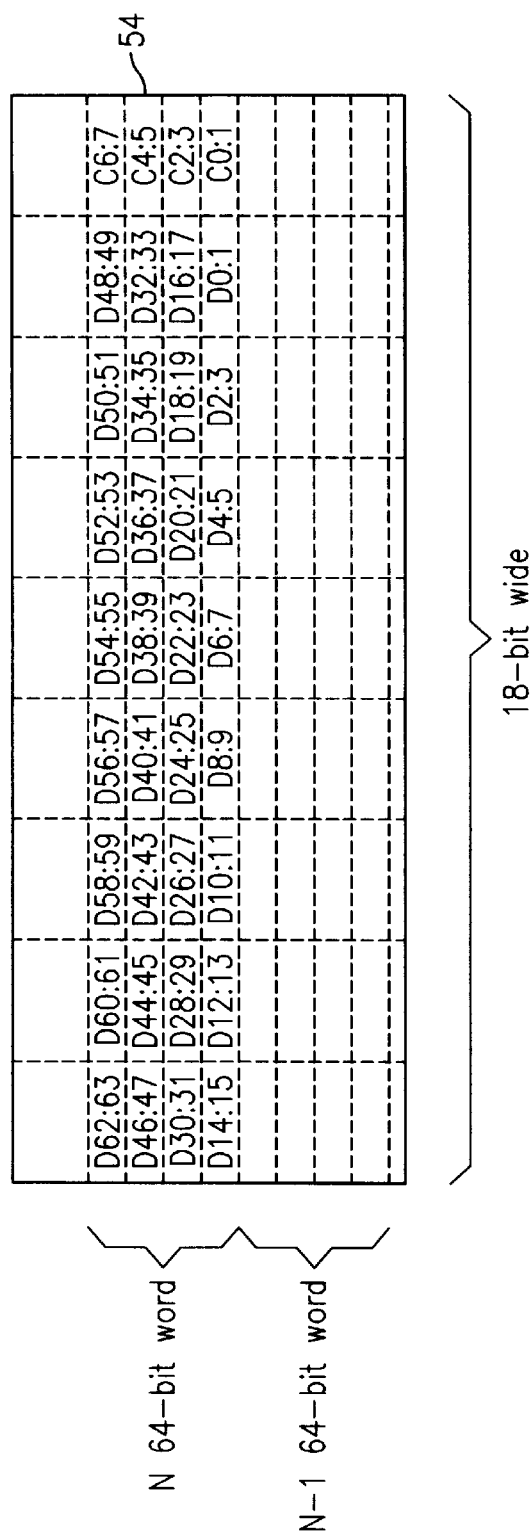
FIG. 7 illustrates an embodiment of a data distribution representing a 72-bit word which includes four 18-bit wide data words.
Figure 10:
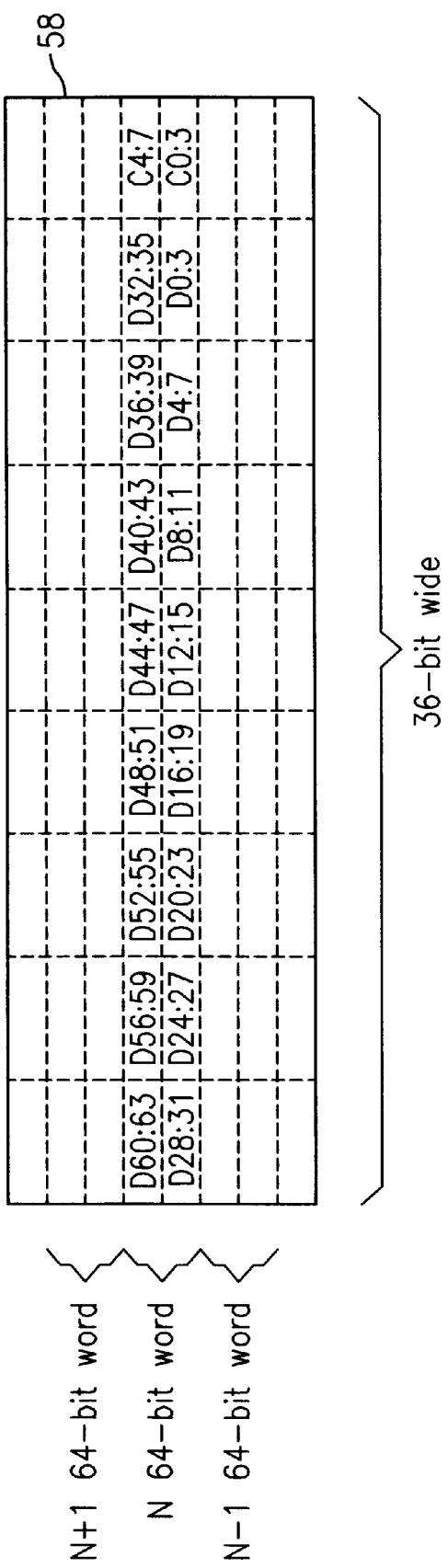
FIG. 10 illustrates an embodiment of a data distribution representing a 72-bit word which includes two 36-bit wide data words.
Figure 13:
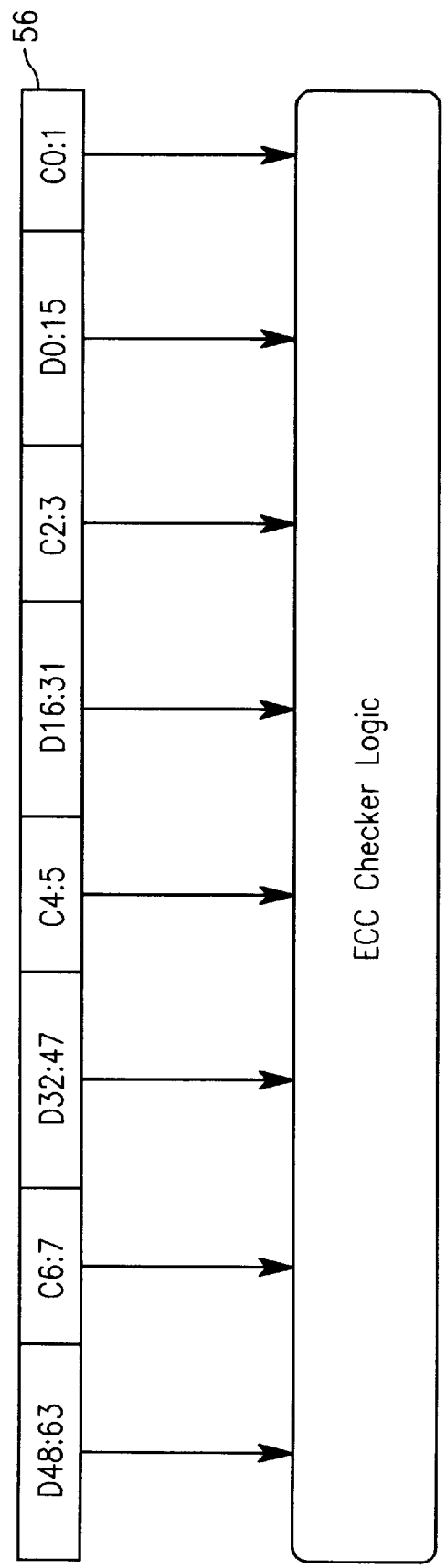
FIG. 13 illustrates an embodiment of a 72-bit wide ECC encoded data word in accordance with the embodiment of FIG. 7.

ECC logic 49 encodes data sent from the CPU 55 to be stored in burst DRAM 43 with an optimized ECC shown in FIG. 3, and described in more detail below. The result is a 72-bit block word 51, of which 64 bits are data and eight bits are error bits, or check bits. BDAC 47 converts this 72-bit word into a 9-bit wide data stream that is then communicated to one or more of the burst DRAMs 43. An illustration of the 72-bit block word 51 within the burst data stream from 9-bit DRAMs is provided in FIG. 3. FIG. 4 illustrates re-conversion of the word 51 by BDAC 47 during a read operation into a 72-bit wide word 53 applied to ECC logic 49. Similarly, an illustration of a 72-bit word 54 within the burst data stream from 18-bit DRAMs 43 is provided in FIG. 7. FIG. 13 illustrates re-conversion of the word 54 by BDAC 47 during a read operation into a 72-bit wide word 56 applied to ECC logic 49. An illustration of a 72-bit word 58 within the burst data stream for 36-bit DRAMs is provided in FIG. 10. FIG. 14 illustrates re-conversion of the word 58 by BDAC 47 during a read operation into a 72-bit wide word 60 applied to ECC logic 49.

FIG. 5 illustrates a parity-check matrix for an error correction code for an embodiment using 9-bit DRAMs 43 in accordance with the present invention. Based upon reliability data of traditional DRAMs, the prevalent memory failures were caused most often by a single bit (soft or hard) error, or the failure of a single DRAM device. The error correction code in accordance with the invention has been designed to maximize memory protection for the data bits, and has been optimized for use with burst DRAM devices. The memory overhead of having this burst DRAM ECC is the same as for byte parity and other ECC schemes such as the (72-bit word, 64-bit data) Hsiao codes. Thus, there is no additional memory cost. In addition, the ECC in accordance with the invention is able to correct random single bit errors and detect random double bit errors.

To generate the error bits for an associated 64 data bits, an exclusive OR (XOR) operation is performed by ECC logic 49 on the data bits in the locations of each row in the matrix of FIG. 5 having ones. Implementation of the XOR function within an ASIC using Boolean logic is straightforward, and will not be described herein in detail. Performing this operation for each of the eight rows produces the eight error bits. The 64 bits of data and eight error bits are then written to burst DRAM array 93 via BDAC 47. When a read operation occurs, the 64 data bits and eight error bits are read from the burst DRAM array 93, and the XOR operation is again performed on each row, this time including all 72 bits. By performing this operation on each of the eight rows of the matrix of FIG. 5, eight syndrome bits S(0–7) are produced, which essentially form the unique error code for each bit location. Similarly, for embodiments using 18-bit and 36-bit DRAMs 43, FIGS. 8 and 11, respectively, illustrate a parity-check matrix for an error correction code for the 18-bit and 36-bit DRAMs of the DRAM array 93, respectively, in accordance with the present invention.

FIG. 6 illustrates a syndrome table corresponding to the matrix of FIG. 5 for the 9-bit DRAM embodiment according to the present invention. The left-hand number in each entry is a hexadecimal number (h) of the eight syndrome bits, and the right-hand value is the type of error and the bit in error, if known. As indicated in the upper left hand corner of the table of FIG. 6, if all eight syndrome bits are all zero (00h) then no error is detected. If the syndrome bits contain any ones, either a single bit (DB), check bit (CB) or multiple bit error (UNCER) is detected. As is apparent from FIG. 6, if the error is a single bit error, i.e., either a single data bit error or a single check bit error, the particular bit in error is identified by the syndrome table and can be corrected by complementing the indicated bit using known methods. For multiple bit errors, an error is detected but the particular bit is uncertain (UNCER) then is not corrected. Preferably, a report of all uncorrectable errors is made to the operating system or appropriate system software to provide notice of the corrupt data so the users or system service personnel can isolate the faults more easily, thus minimizing system down time. In accordance with the invention, any error that is detected or corrected can be reported to the system software or stored in a special archive for later use during servicing.

Figure 8:
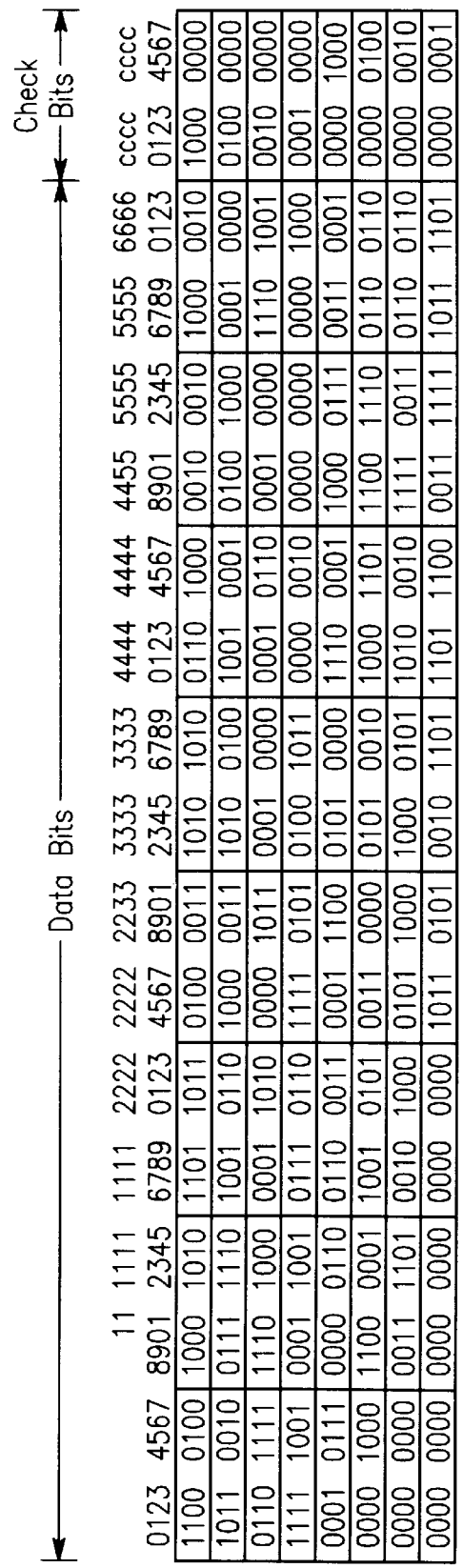
FIG. 8 is a parity-check matrix in accordance with an 18-bit DRAM embodiment according to the present invention.
Figure 11:
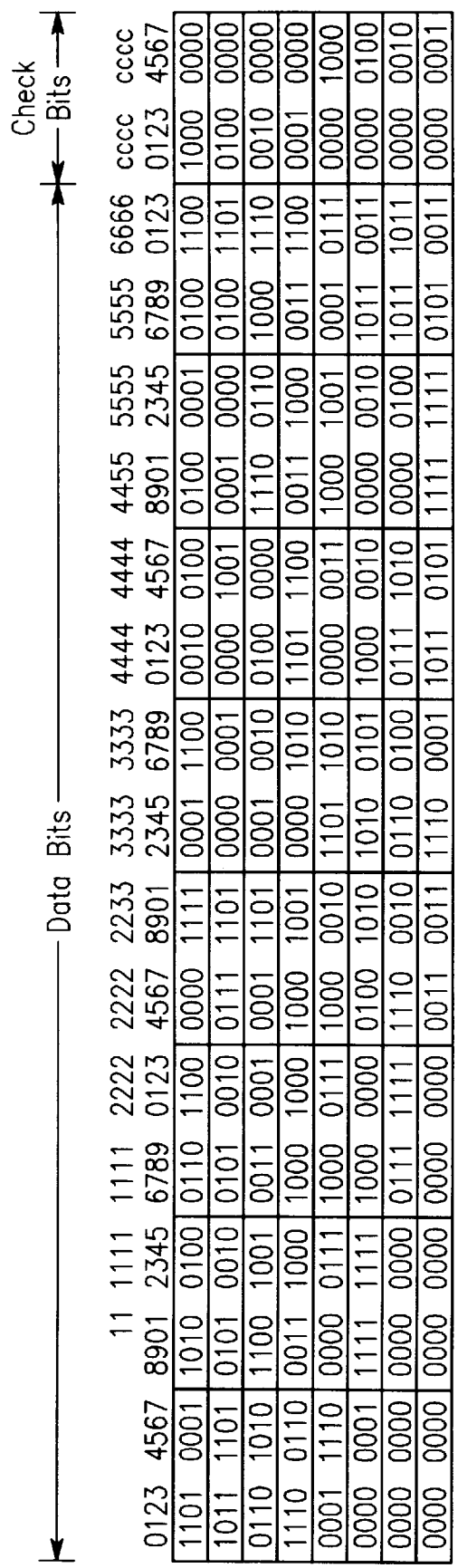
FIG. 11 is a parity-check matrix in accordance with a 36-bit DRAM embodiment according to the present invention.

FIG. 8 illustrates a parity-check matrix for an error correction code for an embodiment using 18-bit DRAMs 43, and FIG. 9 illustrates a syndrome table corresponding to the matrix of FIG. 8. Similarly, FIG. 11 illustrates a parity-check matrix for an error correction code for an embodiment using 36-bit DRAMs 43, and FIG. 12 illustrates a syndrome table corresponding to the matrix of FIG. 11.

In general, for error correction to be accomplished successfully, the relationship between the number of data bits, m, to be checked and the number of error bits, k, associated with those m data bits is as follows: $2^k-1-k \geq m$. If multiple (p) burst data words are grouped to form a block word on which ECC operations are performed, the block word has (p·m) data bits and (p·k) error bits for a total of (p·m)+(p·k) bits, where the "·" symbol denotes multiplication. Thus, the relationship between the data bits and the error bits for the block word is as follows: $2^{(p \cdot k)}-1-(p \cdot k) \geq (p \cdot m)$. The present invention is applicable, in general, to any size of burst memory device with any number of check bits. To illustrate a non-conventional example, an 11-bit memory with 10 data bits and 1 check bit could be used. In this 11-bit case, seven burst cycles are used to collect a 77-bit word with 70 data bits and 7 check bits, where p=7, k=1 and m=70. Although the present invention is illustrated using DRAM devices, it is understood that any type of programmable memory device may be used since the present invention is not limited to any particular memory technology.

It can now be appreciated that a system and method according to the present invention takes advantage of increased speed and performance of proposed burst memory devices and memory subsystems while also providing error detection and/or correction. The present invention was illustrated in a memory subsystem embodiment for a computer system. It is understood, however, that the present invention may be used in any memory system which uses error detection and error correction operations to ensure data integrity.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A memory system for performing error detection and correction, comprising:
   at least one memory device that stores a plurality of data words, each data word having a plurality of data bits and at least one associated check bit;
   burst circuitry coupled to said at least one memory device that reads a plurality of said data words in multiple burst cycles from said at least one memory device into a block word so that said block word includes a sufficient number of check bits to perform detection of double bit errors and correction of single bit errors; and
   error logic coupled to said burst circuitry that receives and performs error detection and correction upon said block word.

2. The memory system of claim 1, wherein:
   said error logic generates a syndrome code from said block word and uses said syndrome code to detect and correct single bit errors and to detect double bit errors.

3. The memory system of claim 1, wherein said error logic uses a parity-check matrix and a corresponding syndrome table to detect any double bit errors and to correct single bit errors if said errors are correctable.

4. The memory system of claim 1, wherein said at least one memory device comprises an array of n-bit memory devices.

5. The memory system of claim 4, wherein said array of n-bit memory devices comprise burst dynamic random access memory (DRAM) devices.

6. The memory system of claim 1, wherein:
   each data word includes n data bits and k check bits, where n and k are positive integers; and
   said burst circuitry groups p data words to form a block word having (p·n) data bits and having (p·k) check bits, for a total of (p·n)+(p·k) bits, where $2^{(p \cdot k)} - 1 - (p \cdot k) \geq (p \cdot n)$.

7. The memory system of claim 6, wherein n=8, k=1 and p=8.

8. The memory system of claim 6, wherein n=16, k=2 and p=4.

9. The memory system of claim 6, wherein n=32, k=4 and p=2.

10. The memory system of claim 1, wherein said at least one memory device comprises at least one burst dynamic random access memory (DRAM) device.

11. A computer system, comprising:
   a processor;
   a processor bus coupled to said processor; and
   a memory subsystem coupled to said processor bus that performs error detection and correction operations, comprising:
      a memory device that stores a plurality of data words, each data word having a plurality of data bits and at least one associated check bit;
      memory control circuitry coupled to said memory device that reads a plurality of said data words in multiple memory cycles into a block word so that said block word includes a sufficient number of check bits to perform error detection and correction upon associated data bits of said block word; and
      ECC logic coupled to said memory control circuitry that receives and performs error detection and correction upon said block word.

12. The computer system of claim 11, wherein:
   said ECC logic generates a syndrome code from said block word and uses, said syndrome code to detect and correct single bit errors and to detect double bit errors.

13. The computer system of claim 11, wherein said ECC logic uses a parity-check matrix and a corresponding syndrome table to detect any errors and to correct said errors if said errors are correctable.

14. The computer system of claim 11, wherein said memory device comprises an array of memory devices.

15. The computer system of claim 14, wherein said array of memory devices comprise burst dynamic random access memory (DRAM) devices.

16. A method of detecting and correcting bit errors in a memory that stores a plurality of data words and at least one check bit per data word, comprising steps of:
   reading a plurality of data words from the memory device to form a block word that includes a sufficient number of check bits to perform error detection of double bit errors and correction of single bit errors upon associated data bits of the block word;
   generating a syndrome code from the data and check bits of the block word; and
   using a syndrome table to detect and correct any single bit errors and to detect any double bit errors within said block word.

17. The method of claim 16, wherein said step of generating a syndrome code comprises a step of using a parity-check matrix.

18. The method of claim 16, wherein said step of reading a plurality of data words comprises bursting the data words in at least one burst memory cycle.

19. The method of claim 16, wherein each data word includes n data bits and k check bits, wherein said step of reading a plurality of data words comprises a step of reading p data words from the memory device, wherein said block word includes (p·n) data bits and (p·k) check bits, and wherein $2^{(p \cdot k)} - 1 - (p \cdot k) \geq (p \cdot n)$.

20. The method of claim 19, wherein n is a multiple of eight bits, wherein (p·n) is equal to 64 and wherein (p·k) is equal to eight.

* * * * *

UNITED STATES PATENT AND TRADEMARK OFFICE
CERTIFICATE OF CORRECTION

PATENT NO.         : 5,922,080                                     Page 1 of 2
APPLICATION NO.    : 08/940054
DATED              : July 13, 1999
INVENTOR(S)        : Sompong P. Olarig It is certified that error appears in the above-identified patent and that said Letters Patent is hereby corrected as shown below:

IN THE DRAWINGS

Please insert the following Fig. 14

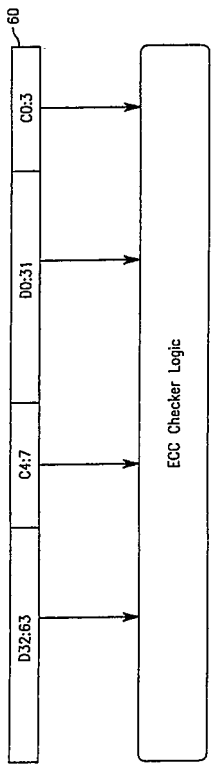

UNITED STATES PATENT AND TRADEMARK OFFICE
CERTIFICATE OF CORRECTION

PATENT NO. : 5,922,080
APPLICATION NO. : 08/940054
DATED : July 13, 1999
INVENTOR(S) : Sompong P. Olarig It is certified that error appears in the above-identified patent and that said Letters Patent is hereby corrected as shown below:

IN THE CLAIMS

Column 9, Claim 6, line 9, delete "$\geq$" and insert therefore --$>$--

Column 10, Claim 19, line 37, delete "$\geq$" and insert therefore --$>$--

Signed and Sealed this

Twenty-fourth Day of October, 2006

JON W. DUDAS
*Director of the United States Patent and Trademark Office*